Sept. 20, 1949.　　　L. S. HUBBERT ET AL　　　2,482,342
MOLDING APPARATUS

Filed March 7, 1946　　　　　　　　　　　　3 Sheets-Sheet 1

INVENTORS
LESLIE S. HUBBERT,
HAROLD J. MILLER
BY Toulmin & Toulmin
ATTORNEYS

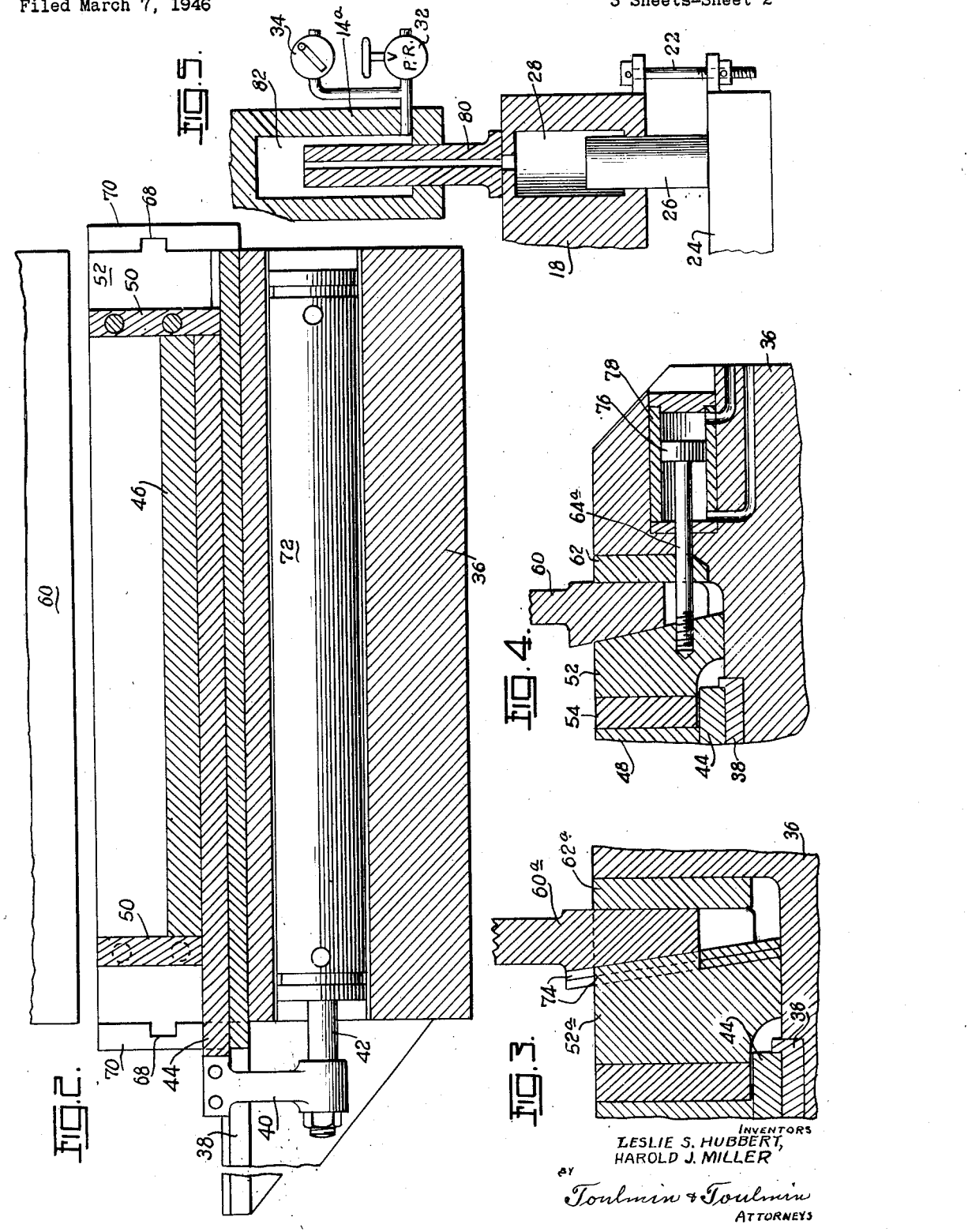

Sept. 20, 1949.　　　L. S. HUBBERT ET AL　　　2,482,342
MOLDING APPARATUS

Filed March 7, 1946　　　　　　　　　　　3 Sheets-Sheet 3

INVENTORS
LESLIE S. HUBBERT,
HAROLD J. MILLER
Toulmin + Toulmin
ATTORNEYS

Patented Sept. 20, 1949

2,482,342

UNITED STATES PATENT OFFICE 2,482,342

MOLDING APPARATUS

Leslie S. Hubbert and Harold J. Miller, Mount Gilead, Ohio, assignors to H-P-M Development Corporation, Wilmington, Del., a corporation of Delaware Application March 7, 1946, Serial No. 652,670

5 Claims. (Cl. 18—16)

This invention relates to presses and methods and apparatus associated therewith for clamping molds, dies and workpieces during pressing.

In the pressing of certain materials, especially metal powders such as tungsten carbides and other granulated materials which are formed under a high pressure, it is necessary that the mold within which the material is pressed be clamped together firmly and positively. In many such presses, the time of the work cycle is determined by the time required to remove the pressed workpiece and to reload and clamp the mold together, the actual pressing time being of relatively small duration.

One of the particular objects of this invention is to provide an apparatus for a molding operation of this type wherein the auxiliary operations of opening and closing the mold, of removing the workpiece and refilling the mold is accomplished in a minimum of time whereby a more rapid work cycle results and the pressing apparatus is consequently more productive.

Another object is to provide a press in which there is a mold to be clamped having means for automatically clamping the mold as the pressing member advances into the mold.

Still another object is to provide a press according to the foregoing object in which the retraction of the work plunger from the mold effects the opening of the mold.

Another object is to provide a method of pressing granulated material such as metallic powders in which the mold is automatically clamped together by the motion of the pressing plunger and retained clamped with a predetermined and constant thrust.

It is also an object to provide a molding press having a pressing plunger and mold clamping means in which the power required for actuating the mold clamping means is derived from the motor that drives the pressing plunger and in which the said derived power is maintained at a minimum.

More broadly, it is an object of this invention to apply a transverse pressure to a mold, die or workpiece in a press by the movement of the pressing plunger toward the work.

These and other objects and advantages will become more apparent upon reference to the following description and accompanying drawings in which:

Figure 2 is a transverse section taken on the line 2—2 of Figure 1;

Figure 3 is a fragmentary view of a modified construction;

Figure 4 is still another modification;

Figure 5 shows a modified arrangement employed in connection with the means to develop pressure on the mold clamping mechanism.

Figure 1:
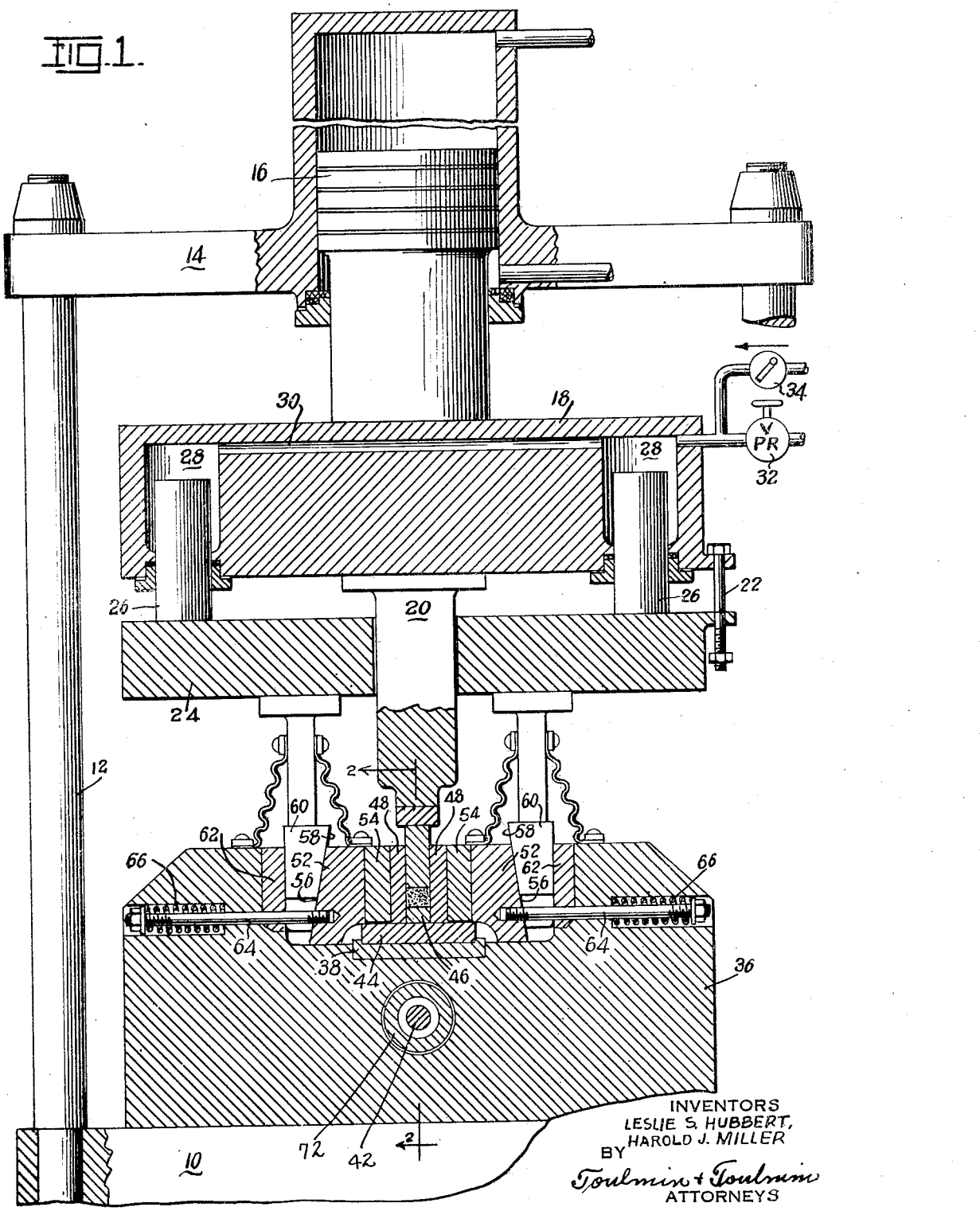
Figure 1 is a vertical section through a press constructed according to this invention.

Referring to the drawings, the press illustrated in Figure 1 comprises a bed 10 which is connected by the strain rods 12 with a head 14 that mounts a double acting fluid ram 16.

Connected with the ram 16 is a platen 18 which supports the punch 20. Suspended from the platen 18, as by the adjustable rods 22, is a second platen 24 that has connected therewith the plungers 26 extending into the cylinders 28 in the platen 18.

The cylinders 28 are interconnected by a passage 30 which connects with the inlet side of an adjustable pressure relief valve 32. When the plungers 26 are advanced into the clyinders 28, the displaced fluid therefrom passes through the relief valve 32 at a predetermined pressure. This predetermined pressure acts on the upper ends of the plungers 26 and offers a predetermined resistance to their movement into the cylinders 28. When the plungers 26 move out of the cylinders 28, the said cylinders are freely filled through the check valve 34 that opens into the inlet side of the relief valve 32.

Mounted on the bed 10 of the press is a block 36 that comprises the base or body of the mold or die to be clamped and clamping means therefor according to this invention.

The base 36 supports a plate 38 which acts as a slide for guiding the mold or die into and out of operative position. The slide 38 extends beyond the press at one side, as seen in Figure 2, and is slotted to permit an arm 40 to extend from a fluid operable plunger 42 into engagement with a mold carrier plate 44.

Mounted on the carrier plate 44 is a die or mold which consists of a bottom plate 46, side plates 48 and end plates 50 which are preferably loosely doweled, one to each side plate. By this arrangement the side plates are movable laterally to release a workpiece pressed within the cavity formed thereby.

For moving the plates 48 toward each other there are provided the wedges 52 which carry on their faces blocks 54 that are for the purpose of accommodating the wedges to different sized molds. The wedges have the inclined faces 56 against which bear the faces 58 of the movable wedges 60 which are carried on the platen 24. Between the wedges 60 and the base 36 are wear plates 62 that are replaceable after the mold has been used for a length of time.

In order to withdraw the wedges 52 from engagement with the side plates of the mold, there are provided the laterally extending rods 64 which have springs 66 continuously urging them outwardly in opposition to the action of the wedges 60.

The wedges 52 preferably comprise the tongues 68 extending into grooves in the plates 70 carried on the opposite sides of the block 36. The plate 70 thus operates to retain the wedges in place and to guide them laterally to and from the mold side plates.

In operation, the platen 18, is retracted upwardly and the platen 24 is lifted thereby through the connection at 22. This retracts the punch 20 from the mold cavity and withdraws the wedges 60 to permit the springs 66 to separate the wedges 52 and therewith the spacer plates 54 from the mold side plates. Thereafter, fluid is supplied to the motor 72 in the block 36 to actuate the plunger 42 to move the carrier plate 44 and therewith the mold out of the press.

When the mold is moved out of the press the workpiece may readily be removed therefrom due to the looseness of the side plates 48 and a new charge of material placed therein. The motor 72 is then again actuated to return the mold to the position shown in the drawings and the ram 16 is actuated to move the platen 18 downwardly.

As the platen 18 moves downwardly, the platen 24 also moves downwardly until the wedges 60 engage the wedges 52 and move them toward each other until they engage the mold side plates. Thereafter, as the platen 18 continues to advance, the platen 24 is halted and the plungers 26 displace fluid from the cylinders 28. This creates a predetermined thrust downwardly on the wedges 60 and, through the wedges 52, clamps the mold side plates together with a predetermined thrust. The angularity of the surfaces 56 and 58 is preferably such that a sticking taper results so that once the mold is clamped it will not be opened until the platen 18 is retracted.

Further advancing movement of the platen 18 brings the punch 20 into the mold cavity and presses the work therein. The platen 18 may be retracted in response to any predetermined stimuli such as manual means, or automatically by pressure or positionally responsive means. During the retracting movement of the platen 18 the rod 22 picks up the platen 24 and withdraws the wedges 60 so that the springs 66 are again effective through the rods 64 to open the mold. During the retracting movement of the platen 18 prior to the time that the platen 24 is picked up, the cylinders 28 fill freely through the check valve 34.

In Figure 3 there is illustrated a modified construction wherein the wedges 60a and 52a have the cooperating tongue and groove portions 74 by means of which the wedge 52 is positively retracted from the mold when the wedge 60a is retracted by the upward movement of its supporting platen.

In Figure 4 the wedge 52 is actuated inwardly and locked in position by the wedge 60 but may be retracted from the mold by the piston 76 connected with the rod 64a and reciprocable in the cylinder 78. Optionally, fluid pressure may be supplied to the piston 76 initially to move the wedge 52 into position prior to its wedging by the wedge 60 if desired.

In Figure 5 there is illustrated a construction wherein a substantial portion of the thrust supplied to the plunger 26 to actuate the platen 24 is returned to the platen 18. In this view the platen 18 mounts the hollow plunger 80 that extends into a cylinder 82 in the press head 14a. The relief valve 32 and check valve 34 are connected to communicate with the cylinder 82. The diameter of the plunger 80 is slightly smaller than the diameter of the plunger 26 so that when plunger 26 is stationary and the platen 18 is moving there is a displacement of fluid from the cylinders 28 and 82 through the relief valve 32. However, the pressure developed by the relief valve 32 acts not only on the plunger 26 but also on the upper end of the plunger 80 and thus returns a substantial portion of the energy to the platen 18.

Figure 6:
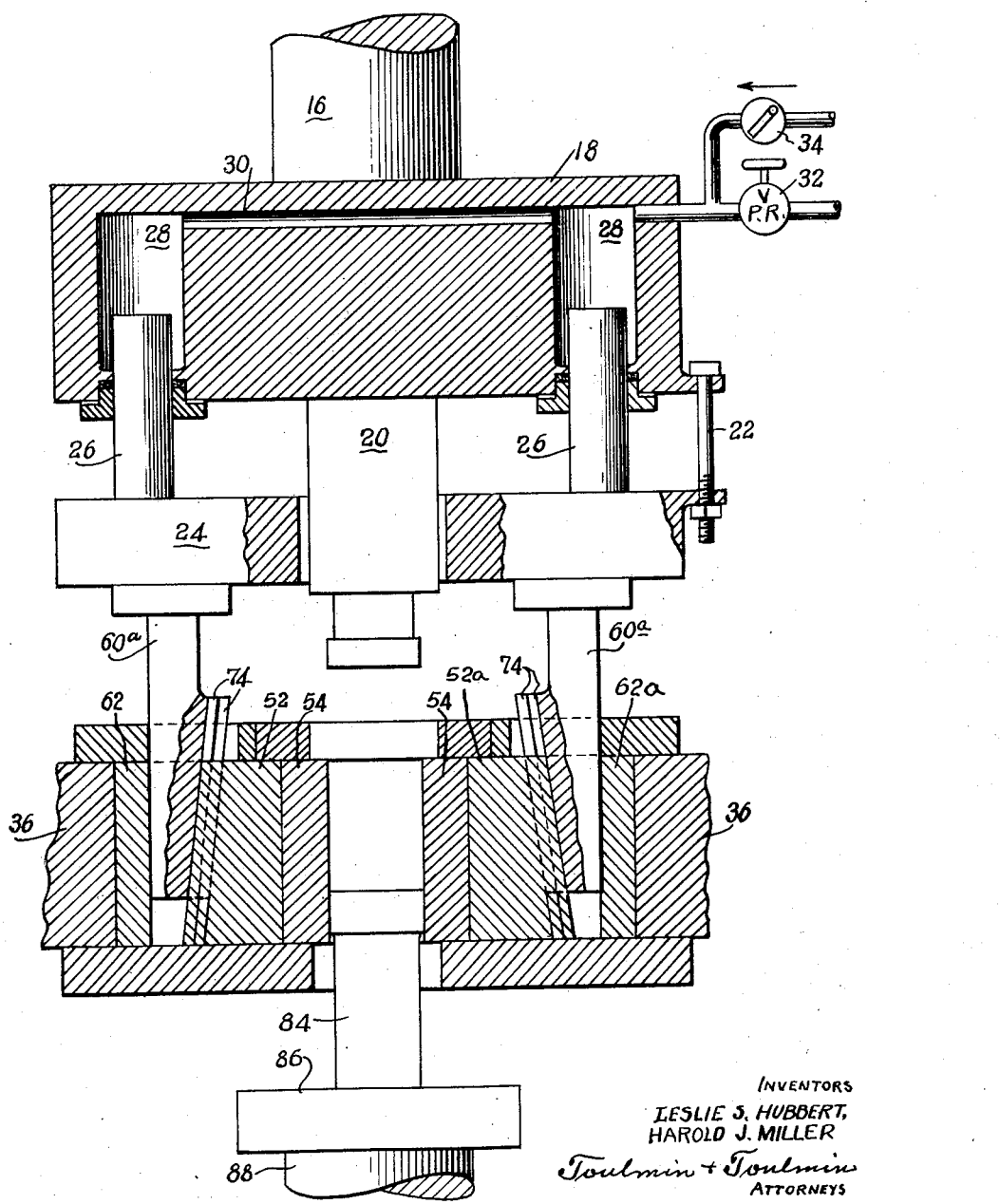
Figure 6 is a fragmentary vertical section through a press having both an upward acting and a downward acting pressing plunger.

The construction illustrated in Figure 6 is similar to that shown in Figure 1 in combination with the modification shown in Figure 3 and is correspondingly numbered. In Figure 6, however, there is an upward acting ram 84 carried by a platen 86 and actuated by a plunger 88. The workpiece may be thus pressed from both sides and more compact products obtained. The mold means shown in Figure 6 may be arranged to reciprocate in and out of the press as in the case of Figure 1, or may be stationary and merely be opened to remove the completed workpiece therefrom.

It will be seen that this invention provides a molding method wherein a single stroke of a press plunger is operable both to clamp the molds together and to press the workpiece in the mold. This substantially decreases the time of a work cycle and eliminates separate hydraulic motors and other equipment to clamp the mold. Further, this invention provides for positive mold clamping means which require little or no additional power for operation.

While the terms die and mold have been used in the specification in the description of this invention, it will be understood that the method and apparatus described are useful in many work operations wherein it is desired to perform both clamping and pressing steps. This would include work operations involving both dies and molds of various types.

It will be understood that this invention is susceptible to modification in order to adapt it to different usages and conditions and, accordingly, it is desired to comprehend such modifications within this invention as may fall within the scope of the appended claims.

We claim:

1. In a molding press, a mold having a bottom and side plates adapted for being clamped against said bottom during a molding operation; a pressing plunger reciprocable into said mold between said side plates to compact said material against said bottom; wedge means to clamp said side plates against said bottom; motor means to actuate said pressing plunger; and other motor means responsive to the pressing movement of said pressing plunger to actuate said wedge means, when said pressing plunger has reached a predetermined position.

2. In a molding press, mold means having a mold bottom and side plates to be clamped against said bottom during molding and to be released therefrom to remove the mold workpiece; a pressing plunger movable into said mold to compact material against said bottom; a wedge associated with each of said side plates; other wedges for actuating said first mentioned wedges; and means responsive to the pressing movement of said plunger for creating a predetermined and substantially constant thrust on said other wedge means, when said pressing plunger has reached a predetermined position.

3. In a molding press; a stationary mold base and a mold carried therein, said mold comprising side plates to be clamped during molding; each of said side plates having a wedge means associated therewith and other wedge means lying between said base and said first mentioned wedge means; a pressing plunger and a platen carrying said plunger and another platen carrying said other wedge means; piston-cylinder means connecting said platens; and means responsive to relative movement of said platens toward each other during the pressing operation for creating a predetermined pressure in said piston-cylinder means thereby to thrust both said wedges together with a predetermined force, when said pressing plunger has reached a predetermined position.

4. In a molding press; a mold base; a mold reciprocably mounted in said base; motor means to reciprocate said mold into said base for a pressing operation and out of said base for a loading operation; a pressing plunger movable toward and away from said mold when the latter is in said frame; wedge means on opposite sides of said mold for clamping the same during pressing; and means responsive automatically to the movement of said plunger toward said mold for exerting a predetermined actuating thrust on said wedge means to maintain said mold clamped during pressing, when said pressing plunger has reached a predetermined position.

5. In a molding press; a stationary mold base; a mold reciprocably carried in said base comprising side plates and end plates certain of said plates being adapted for lateral movement whereby to release a workpiece and said end plates lying between said side plates to predetermine their minimum spacing; wedge means between said side plates and said base and guided in said base; motor means carried by said base operable for reciprocating said mold into and out of said base; a pressing plunger adapted to enter said mold between said plates during the pressing operation; and means operated by the movement of said pressing plunger for actuating said wedges to clamp said plates during pressing and when said pressing plunger has reached a predetermined position and to unclamp said plates after pressing.

LESLIE S. HUBBERT.
HAROLD J. MILLER.

REFERENCES CITED

The following references are of record in the file of this patent:

UNITED STATES PATENTS

| Number | Name | Date |
|---|---|---|
| 1,417,743 | Kempton | May 30, 1922 |
| 1,916,798 | Hottel | July 4, 1933 |
| 2,292,593 | Amigo | Aug. 11, 1942 |